UNITED STATES PATENT OFFICE.

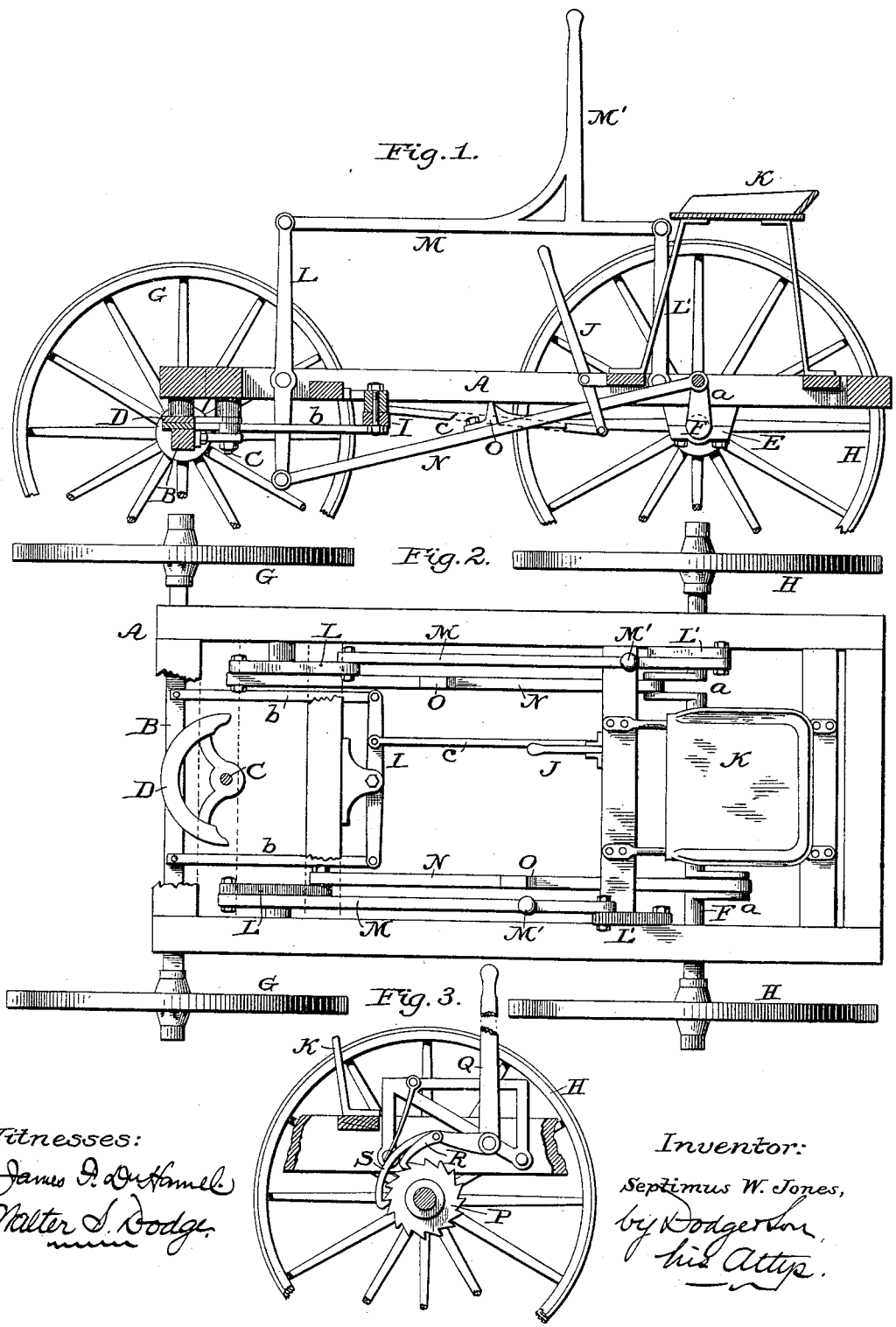

SEPTIMUS W. JONES, OF WILLIAMSPORT, PENNSYLVANIA.

VELOCIPEDE.

SPECIFICATION forming part of Letters Patent No. 344,449, dated June 29, 1886.

Application filed October 3, 1885. Serial No. 178,942. (No model.)

*To all whom it may concern:*

Be it known that I, SEPTIMUS W. JONES, of Williamsport, in the county of Lycoming and State of Pennsylvania, have invented certain new and useful Improvements in Vehicles, of which the following is a specification.

My invention consists in a vehicle provided with a novel combination and arrangement of levers by which I am enabled to propel the vehicle by the hands and feet jointly.

Various details and novel features are embraced in the invention, and will be duly pointed out.

In the annexed drawings, Figure 1 is a vertical longitudinal section through my improved vehicle; Fig. 2, a top plan view of the same; Fig. 3, a detail view illustrating a lever, pawl, and ratchet attachment for giving additional power when required.

Prior to my invention vehicles have been furnished with a cranked axle connected by links or pitmen with hand-levers pivoted to the frame of the vehicle; but as heretofore constructed the levers have been formed with hand-holds at their upper ends, which, of course, each moved through an arc of a circle when the levers were actuated. Under my construction the hand-holds maintain an upright position at all times, and may be carried to any desired height without varying the leverage, a point which is of importance in securing a proper proportion and location of parts.

The construction will be readily understood from the accompanying drawings, in which A indicates a platform or frame having at its forward end an axle, B, connected with the frame by a king-bolt, C, and turn-table D, as in an ordinary carriage. At the rear end of the frame or platform are secured boxes or hangers E, through which a cranked axle, F, passes, and which is preferably supplied with a series of steel rollers to reduce friction, as is now common in bicycles, tricyles, &c. The forward axle, B, carries loose wheels G, and the rear axle, F, has wheels H, made fast upon it so as to turn with the axle, so that by applying power to the cranks *a* thereof, the axle and its wheels shall be caused to rotate and move the vehicle forward.

I indicates a cross-bar pivoted midway between its ends in a horizontal position beneath the frame or platform A, in rear of and parallel with the front axle, B, with which its ends are connected by links *b*, and one end of which connects by a link, *c*, with the lower end of a hand-lever, J, pivoted to the frame A, within easy reach of the operator occupying the seat K.

By moving the hand-lever J the bar I and axle B may be moved to guide or direct the vehicle, as required.

It will be seen that the bar I and links *b* may be omitted, the link *c* in that case connecting directly with the axle B; but I prefer the arrangement shown, because it enables the rider to steer the vehicle by pressing with his foot upon the cross-bar I, and thus leaves both hands free for operating the machine if at any time it be undesirable to move either hand from the actuating-levers for the purpose of steering.

The arrangement of levers for propelling the vehicle will be readily understood by referring to Fig. 1, in which L L' indicate two upright rods or levers pivoted to the frame or platform A, the forward lever, L, being extended below its pivot, and the upper ends of the two levers L L' being connected by a bar, M, from the upper side of which a hand-piece, M', projects to any height required to bring it into convenient reach of the rider. The lower end of lever L is connected by a rod or pitman, N, to one of the cranks *a* of the axle. The levers L L', bar M M', and rod or pitman N are duplicated, and the second pitman, N, connects with the second crank, *a*, of axle F, which crank projects from the axle F in a direction diametrically opposite the first.

In consequence of the construction and arrangement thus described and shown in the drawings the bar M will maintain at all times a horizontal position, and the hand-piece M' will at all times stand vertical, though of course rising and falling as the levers L L' swing back and forth about their pivots. In this way the hand-pieces are maintained always in convenient position for the rider to grasp and move them, and they may be carried to any height required without varying the leverage, which of course depends upon the length of the levers L L', and not upon that of the hand-piece M'.

In order to supplement the power applied manually I provide each pitman N with a foot-piece, O, against which pressure may be applied by the foot, as will be readily understood.

In climbing hills and traveling over rough roads the leverage or power afforded by the mechanism above described may at times prove insufficient, and to meet such difficulty I provide the axle with a ratchet-wheel, P, and I pivot to the frame A a lever, Q, the lower arm of which is fashioned for the hand, and the shorter arm of which has pivoted to it two pawls, R and S, the latter of such length that it begins to engage with the teeth of ratchet-wheel P just as the pawl R ceases to engage therewith, and thus I am enabled to nearly or quite double the length of action of the pawls.

This device may be duplicated, if desired, though for ordinary purposes I do not deem such duplication necessary.

A single wheel may be used in front, instead of a pair.

It is important that the cranked axle F be employed, instead of a straight axle with loose wheels having the pitmen attached to the spokes at the outer face of the wheels, and this for two reasons, first, where the pitmen are attached to the loose wheels, the slipping or more rapid turning of one wheel, as in turning corners, causes the relative positions of the hand-levers to be changed; and, second, the levers and pitmen when placed outside the wheels are spread too far apart to be comfortably operated, and the pitmen cannot carry the foot-pieces which are applied to the pitmen of applicant's machine, or cannot carry them in position to be utilized.

Gearing is undesirable because of great cost, rapid wear through the grinding and cutting of the teeth exposed to dust and dirt, and loss of power due to inevitable play or lost motion, friction, &c.

Having thus described my invention, what I claim is—

1. In combination with a suitable frame and its carrying-wheels, a cranked axle and mechanism for rotating said axle, consisting of upright levers pivoted to the frame and connected by a bar having an upright hand-piece, one of said levers being extended below its pivot and connected with the crank of the axle by a rod or pitman, substantially as described and shown.

2. In combination with frame A, front axle, B, provided with loose wheels G, rear axle, F, having cranks a, and rigidly-attached wheels H, levers L L', connecting-bar M, provided with hand-piece M', and rod or pitman N, connecting the lever L' and crank a.

3. In combination with crank-axle F, lever L, bar M, provided with hand-piece M', and pitman N, connecting the levers L and the cranks a of the axle A, and provided with foot-pieces O, all substantially as described and shown.

4. In combination with axle F and with ratchet-wheel P secured thereon, lever Q, pivoted to the frame of the vehicle and provided with pawls R S, of such relative lengths that one shall come into action just as the other ceases to act without change in the direction of movement of the lever Q.

SEPTIMUS W. JONES.

Witnesses:
J. G. BYERS,
CHAS. F. HARTRANFT.